April 15, 1969   N. J. B. LAVALLÉE   3,438,110
METHOD OF MAKING A TUBE HAVING PERFORATIONS
THROUGH THE WALL THEREOF
Filed Feb. 1, 1966

INVENTOR
NELSON J. B. LAVALLÉE
BY
Raymond A. Robic
ATTORNEYS

United States Patent Office 3,438,110
Patented Apr. 15, 1969

3,438,110
METHOD OF MAKING A TUBE HAVING
PERFORATIONS THROUGH THE WALL
THEREOF
Nelson J. B. Lavallée, Montreal, Quebec, Canada, assignor to Federal Weather Strips Inc., Montreal, Quebec, Canada
Filed Feb. 1, 1966, Ser. No. 524,146
Claims priority, application Canada, Feb. 27, 1965, 924,345
Int. Cl. B23p 15/16
U.S. Cl. 29—155        5 Claims

ABSTRACT OF THE DISCLOSURE

A method of making a tube having a plurality of aligned perforations through the wall thereof, consisting in knurling two parallel edges of a flat sheet of metal to form indentations across the edges and rolling the metal sheet into a tube with the indented edges in abutment against one another.

---

The present invention generally relates to the manufacture of perforated tubes and more specifically to the manufacture of hollow spacer moldings for use in thermo glass panels, the said moldings being intended to contain hygroscopic material and having ventilating apertures through a wall thereof adapted to open in the sealed chamber between the two spaced glass panes.

In the manufacture of such moldings, the present day technique for providing the required ventilating apertures is to drill a series of relatively widely spaced holes through the wall of the hollow molding and then cover the holes with a strip of breathing material glued or otherwise secured to the inner wall of the molding to allow proper ventilation while retaining the hygroscopic material in the molding.

This method and the resulting product have several disadvantages.

The drilling of the hole and the provision of the breathing strip of coarsely threaded material are costly operations which reflect on the total manufacturing cost of the article.

Because the holes are drilled, the tendency is to space them relatively wide apart and increase the size of the holes rather than drill more of them to obtain the same ventilation. This method leads to a poor ventilation and a poor contact of the air within the sealed space and the hygroscopic material and consequently an uneven relative humidity in the sealed space between the two glass panes. There being no air circulation in the said space, condensation would tend to occur at locations where contact with the hygroscopic material is either inexistent or imperfect.

It is therefore a main object of the invention to provide a method of manufacturing a simplified aperture tube or hollow molding, the latter for particular use in thermal glass panels to reduce the manufacturing cost of the said tube or molding.

Another object of the invention lies in providing such a method whereby the molding will have a more even and thorough ventilation between the hygroscopic material in the molding and the captive air in the sealed chamber of the thermal glass panel to which the molding is applied.

The above objects may be obtained in the method of the invention for making a tube with a plurality of aligned perforations through the wall thereof, the method comprising the steps of forming a series of spaced indentations across at least one of two parallel edges of a flat sheet of rigid material and then rolling the flat sheet into a tube with the parallel edges in abutment whereby the indentations form, at the meeting line defined by the abutting edges, a series of apertures through the formed tube.

In the particular case of a hollow spacer molding for use in a thermal glass panel construction, the indentations are formed with such a depth as to prevent flow of the granular hygroscopic material through the apertures.

Also, and in a preferred embodiment of the invention, the inner or outer or both surfaces of the formed tube along the meeting edges are rolled to force the material of the burrs, formed during the knurling of the indentations in the apertures, to reduce the cross section thereof to a size sufficient for areation but small enough to prevent escape of the granular hygroscopic material.

It will of course be understood that in any embodiment, both abutting edges may be formed with indentations adapted to register two by two to form the said perforations, provided that in the case where the tube is to serve as a hollow molding for containing hygroscopic material, the resulting apertures are of a size to prevent flow of the material therethrough.

It is believed that a better understanding of the invention will be afforded by the description that follows having reference to the appended drawings wherein.

As mentioned before, the method of the invention generally applies to the manufacture of rolled tubes provided with a series of longitudinally aligned apertures through the wall thereof.

Figure 1:
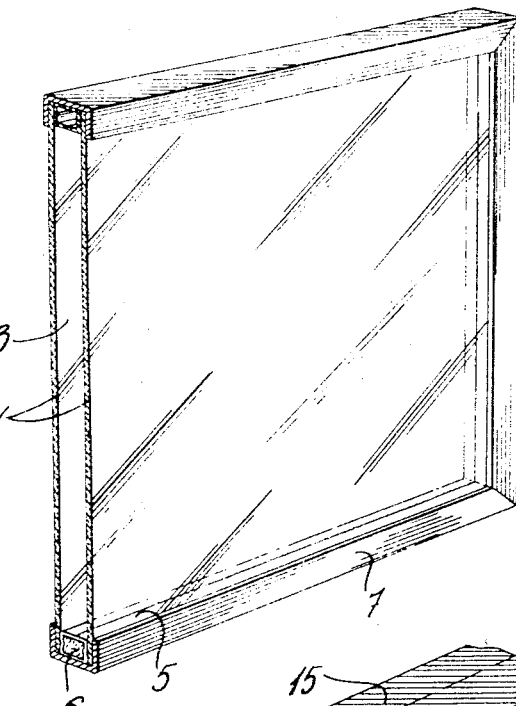
FIG. 1 is a perspective view, partly in cross-section, of a thermal glass panel construction including a molding made according to the method of the invention.
Figure 2:
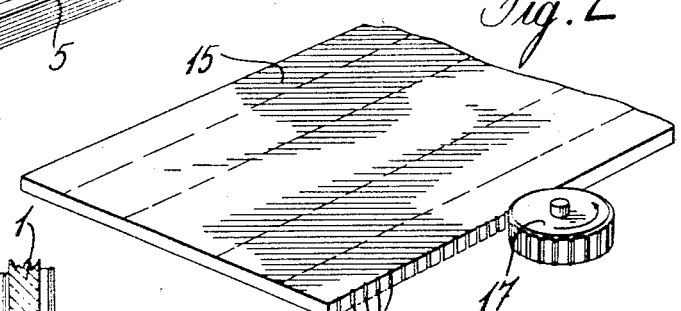
FIG. 2 is a perspective view of a portion of a flat sheet from which the tube or molding is rolled, the figure also illustrating a knurling tool in the process of forming the indentations.

Such a perforated tube finds a specific use in the construction of thermal glass panels such as that shown in FIG. 1, the tube being then used as a sealing molding and is further made to contain hygroscopic material 6. Of course, in this particular use, the apertures through the wall of the molding must be of a restricted size to prevent outflow of the material 6 and yet provide proper ventilation between the hygroscopic material and the trapped air between the glass panes. As mentioned above, this method of operation will prevent the use of a breathing strip to close the apertures against outflow of material and yet allow ventilation of the hygroscopic material. Also, by avoiding the use of such a strip, it will be understood that a much better ventilation may be obtained since the contact is direct between air and hygroscopic material.

Whenever the expression "granular" is used in this specification, it is to be understood that it refers to a material which is in bulk form, that is, either in grains or powder.

Figure 3:
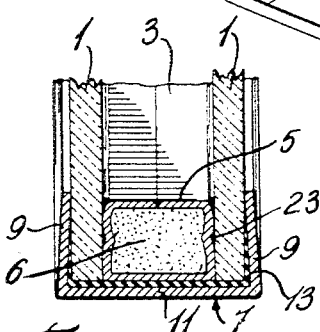
FIG. 3 is a partial cross-sectional view of the panel construction of FIG. 1, on an enlarged scale, and across the frame thereof.

In FIG. 1 is shown a thermal glass panel comprising two spaced glass panes 1 defining therebetween an air chamber 3, panes 1 being held in spaced relationship by means of the molding or tube 5 located, with the edges of panes 1, in a receiving metal frame 7, generally channel-shaped in cross-section, having two lateral flanges 9 interconnected by a web 11 as best shown in FIG. 3. In known manner, in the manufacture of the glass panel, a sticky and adhesive sealing gum layer 13 is laid on the inner faces of flanges 9 and web 11 of the metal frame 7 and then the assembly of the two glass panels 3 and the molding 5 is inserted in the channel. Thereafter, flanges 9 are pressed inwardly to securely clamp and retain the components together.

Figure 4:
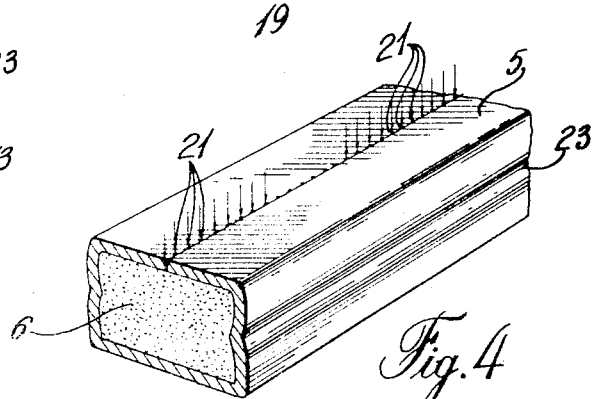
FIG. 4 is a perspective view, with part in cross-section, of a molding made according to the method of the invention.

In accordance with the teaching of the invention, the tube or molding 5 is formed from a flat sheet 15 of rigid material, preferably aluminum. Prior to rolling flat sheet 15 into tube or hollow molding form, at least one edge of two parallel edges thereof is knurled with a knurling tool or wheel 17 whereby to produce on the said edge a series of spaced indentations 19 thereacross. Flat sheet 15 is thereafter rolled to form the said molding or tube 5 with the parallel edges in abutment whereby the said indentations 19 define with the other edge a series of apertures 21 through the formed tube as best illustrated in FIG. 4. By this method, it is easily possible to considerably reduce the cross-section of the apertures while multiplying the number thereof to arrive at substantially the same ventilating cross-section as with conventional methods where more widely spaced holes of a greater diameter were drilled. Also, the ventilation is more even and more widely distributed as in previous methods.

It will of course be realized that the indentations may be made on the two parallel edges in such a way as to correspond two by two whereby to register when the edges are in abutment to form the said apertures.

In the case where the tube 5 is to be used as a hygroscopic material-containing molding, the depth of indentations 19 must be of such a size as to prevent outflow of the hygroscopic material.

In pressure forming the said indentations, burrs will of course project beyond the flat surfaces of the sheet 15 and, in the prefered form of the invention, at least one of the surfaces of the formed molding along the abutting edges is rolled so as to force the material of the burrs in the apertures to thus reduce the cross-section thereof to a size such as to prevent escape of the granular hygroscopic material therethrough but at the same time to leave an aperture sufficient for proper ventilation. In this manner, it will be realized that the depth of indentations 19 is not so important so that the requirement for accurate machining is less when the burrs are rolled in as suggested in this preferred embodiment.

When tube 5 is to be used as a molding for a thermal glass panel construction, the tube is rectangular in cross-section with the aligned apertures along one face thereof and the faces of the tube adjacent the said face are preferably formed with longitudinal recesses 23 which will serve to contain sealing material when the two flanges 9 of the metal frame 7 are pressed in as mentioned above.

Although a specific embodiment of the invention has just been described, it will be understood that various modifications may be made thereto without departing from the spirit of the invention as set forth in the appended claims.

I claim:

1. A method of making a tube with a plurality of aligned perforations through the wall thereof, comprising the steps of:
    (a) forming a series of spaced indentations across one of two parallel edges of a flat sheet of rigid material;
    (b) rolling said flat sheet into a tube with said parallel edges in abutment whereby said indentations define with the other of said edges a series of apertures through the formed tube.

2. A method as claimed in claim 1 including the further step of forming spaced indentations across the other of said two parallel edges before rolling said sheet into a tube; said further indentations to correspond in size and positions to the first indentations whereby to register therewith after the tube is formed.

3. A method of making a tube with a plurality of aligned perforations through the wall thereof, comprising the steps of:
    (a) forming a series of spaced transverse grooves across one of two parallel edges of a flat sheet of rigid material;
    (b) rolling said flat sheet into a tube with said parallel edges in abutment whereby said grooves define with the other of said edges a series of apertures through the formed tube.

4. A method of making a hollow spacer molding for thermo glass panels, said hollow molding intended to contain a granular hygroscopic material, comprising the steps of:
    (1) forming a series of spaced indentations across one of two parallel edges of a flat sheet of ragid material;
    (2) rolling said flat sheet into a tube with said parallel edges in abutment whereby said indentations define with the other of said edges a series of apertures through the formed tube;
    (3) said indentations having a depth such as to prevent flow of said granular hygroscopic material through said apertures.

5. A method of making a hollow spacer molding for thermo glass panels, said hollow molding intended to contain a granular hygroscopic material, comprising the steps of:
    (a) pressure forming a series of spaced indentations across one of two parallel edges of a flat sheet of rigid material with burrs projecting from the flat surface of said sheet around the indentations;
    (b) rolling said flat sheet into a tube with said parallel edges in abutment whereby said grooves define with the other of said edges a series of apertures through the formed tube;
    (c) rolling at least one of the surfaces of the formed molding along said edges to force the material of said burrs in said apertures to reduce the cross section thereof to a size such as to prevent escape of said granular hygroscopic material therethrough.

References Cited

UNITED STATES PATENTS

| | | | |
|---|---|---|---|
| 926,000 | 6/1909 | Hallowell | 29—422 X |
| 2,249,127 | 7/1941 | Goetze | 29—422 X |
| 2,793,421 | 5/1957 | Brumbaugh | 29—163.5 X |

THOMAS H. EAGER, *Primary Examiner.*

U.S. Cl. X.R.

29—163.5, 422; 138—156